No. 742,023. PATENTED OCT. 20, 1903.
B. J. HARRIS.
APPARATUS FOR LOADING OR UNLOADING VESSELS.
APPLICATION FILED JULY 2, 1902. RENEWED AUG. 7, 1903.
NO MODEL. 3 SHEETS—SHEET 3.
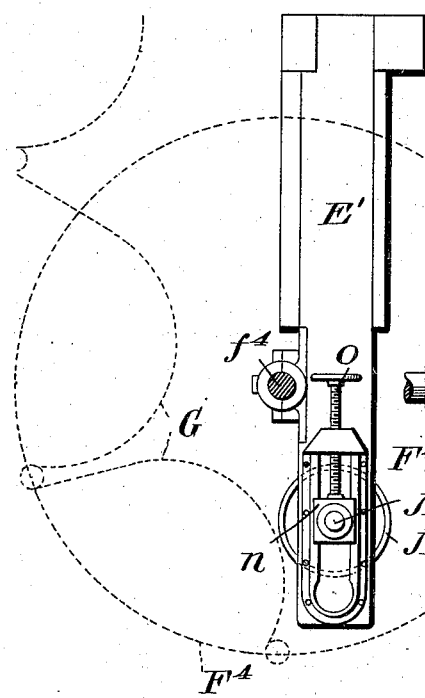
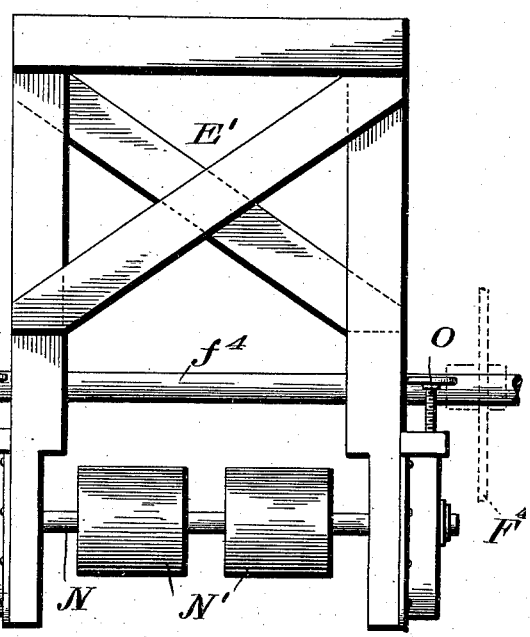
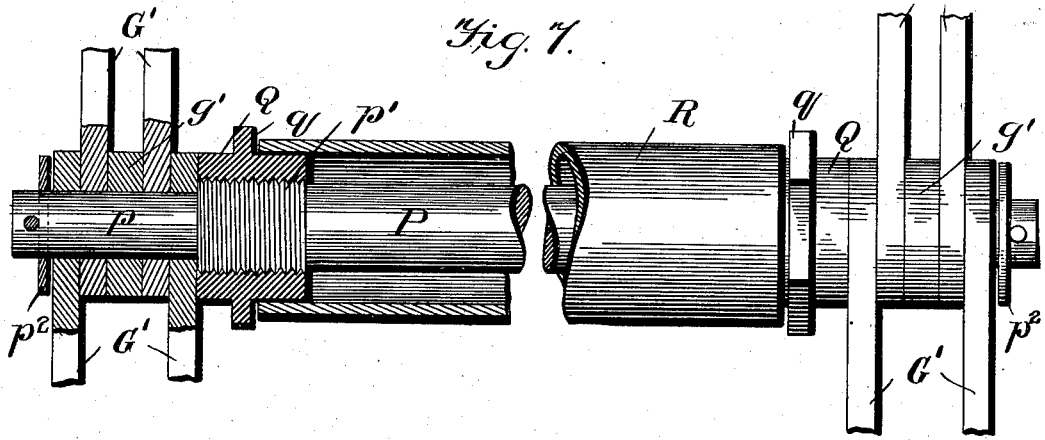

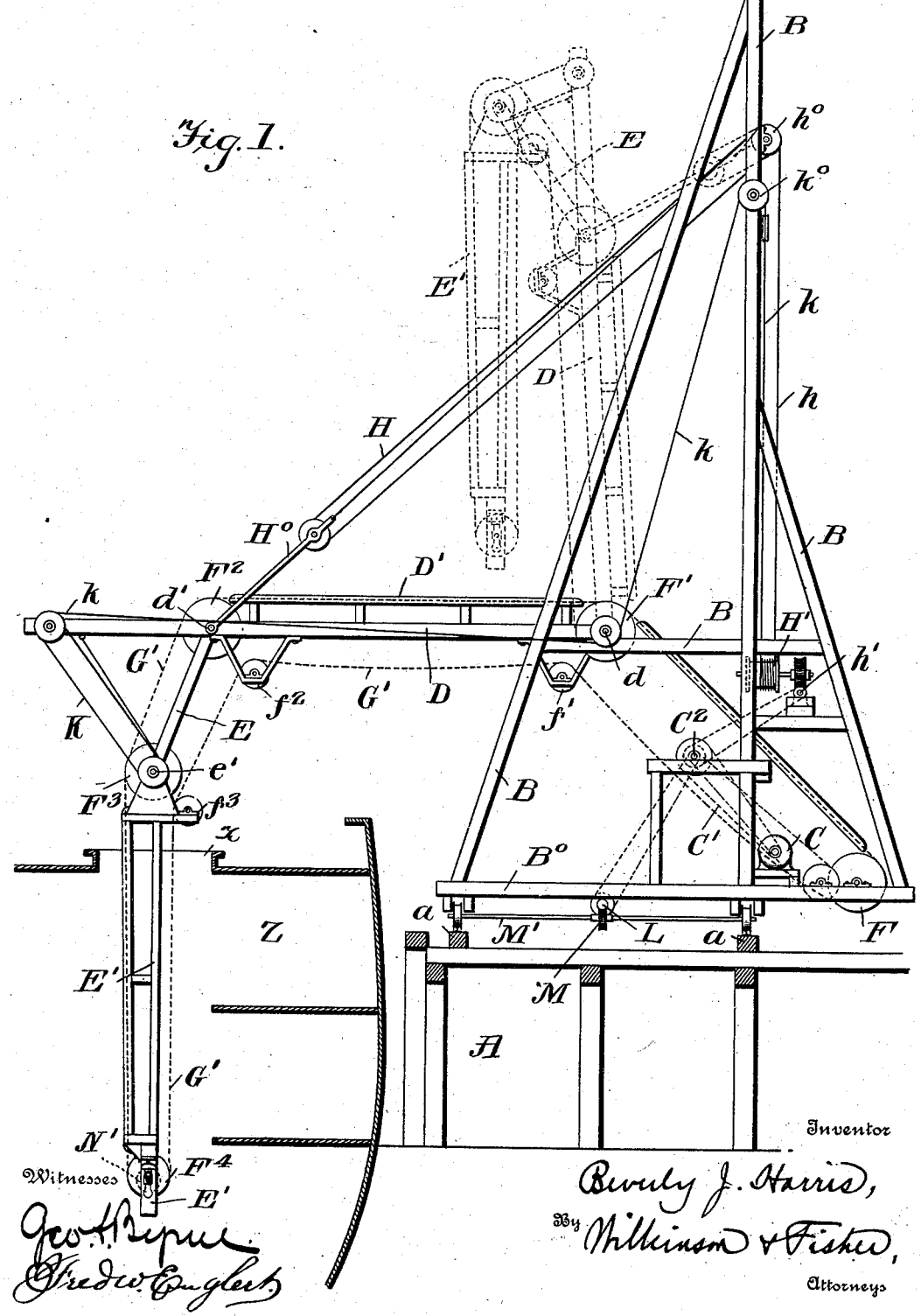

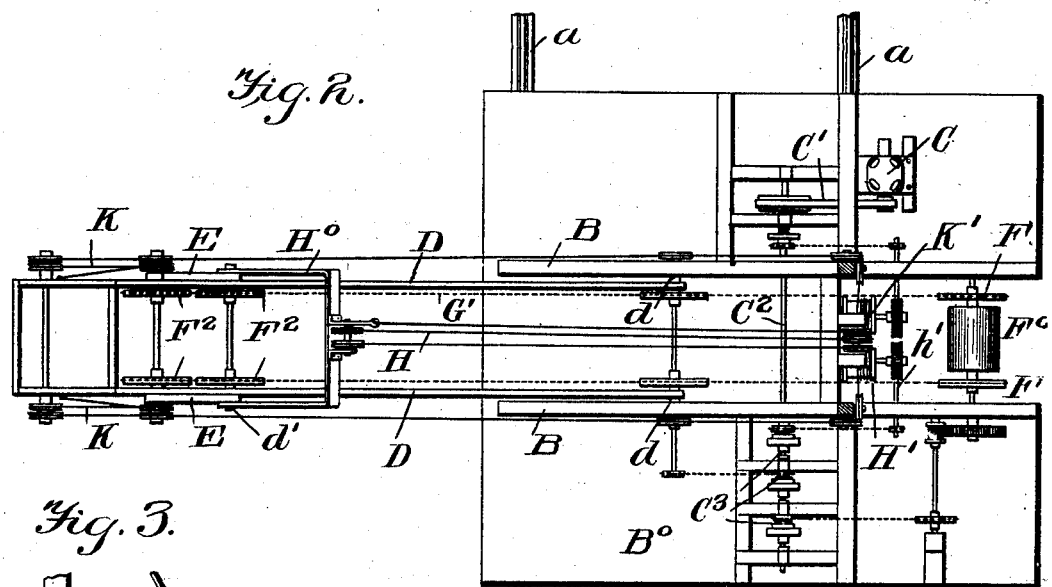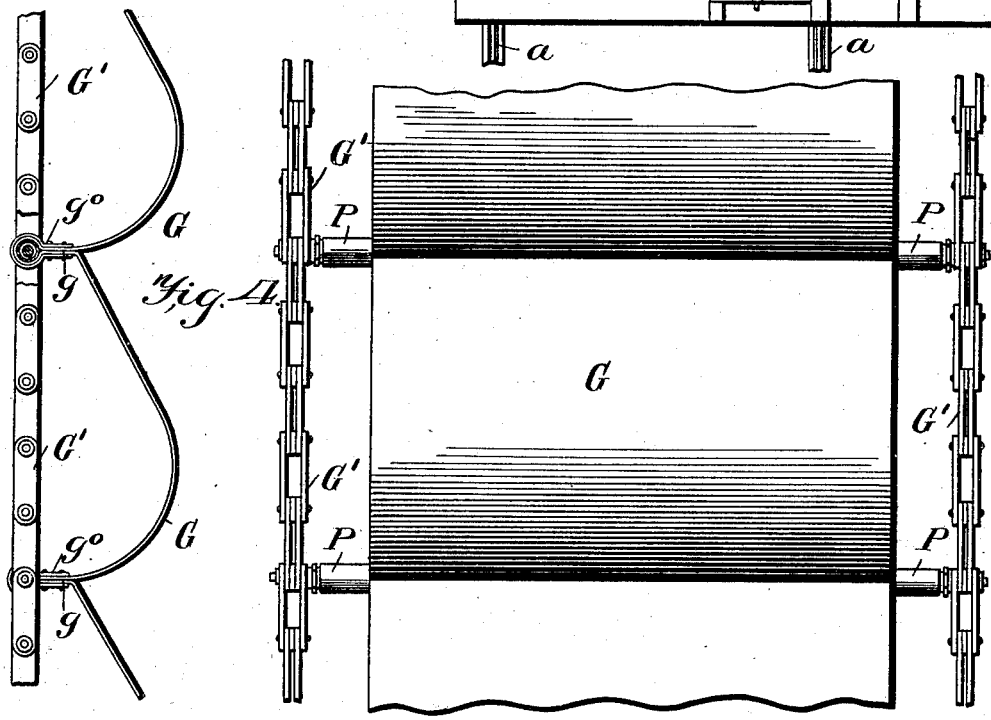

No. 742,023.    Patented October 20, 1903.

UNITED STATES PATENT OFFICE.

BEVERLY J. HARRIS, OF NEW ORLEANS, LOUISIANA.

APPARATUS FOR LOADING OR UNLOADING VESSELS.

SPECIFICATION forming part of Letters Patent No. 742,023, dated October 20, 1903.

Application filed July 2, 1902. Renewed August 7, 1903. Serial No. 168,682. (No model.)

*To all whom it may concern:*

Be it known that I, BEVERLY J. HARRIS, a citizen of the United States, residing at New Orleans, in the parish of Orleans and State of Louisiana, have invented certain new and useful Improvements in Apparatus for Loading or Unloading Vessels; and I do hereby declare the following to be a full, clear, and exact description of the invention, such as will enable others skilled in the art to which it appertains to make and use the same.

This invention relates to improvements in apparatus for loading or unloading vessels and for similar purposes; and it has for its object to provide more especially a suitable apparatus for the rapid loading and unloading of bananas, loose oranges, fruits, vegetables, and other like articles that require careful handling to avoid injury.

This invention relates more especially to improvements upon the apparatus shown in the patent to myself, No. 582,057, granted May 4, 1897.

The present invention relates more particularly to the means by which the apparatus described in the said patent may be adjusted to compensate for the rise and fall of tide, for the varying width of beam of the vessel to be loaded or unloaded, and for transporting the apparatus from hatch to hatch of the vessel without necessitating the moving of the vessel itself.

Reference is had to the accompanying drawings, in which the same parts are indicated by the same letters throughout the several views.

Figure 1 is an elevation of the apparatus and a vertical section of the dock and ship. Fig. 2 is a plan view of the apparatus with the ship removed. Figs. 3 and 4 show details of the looped endless apron on which the fruit or like article is carried. Figs. 5 and 6 are details showing the dumping-idlers for emptying the pockets in the apron at the desired angle; and Fig. 7 is an enlarged view, partly in section, of one of the cross-ties between the carrier-chains, to which the loops of the apron are secured.

A represents a wharf or dock having rails $a$ for the wheels of the platform $B^0$, on which platform is mounted the framework B. This platform also carries any suitable motor C, preferably an electric motor, which may be connected, as by a belt $C'$, to the drive-shaft $C^2$, from which the various parts of the apparatus are operated and by which the platform $B^0$ may be moved along the tracks, as will be hereinafter described.

D is a swinging frame pivoted, as at $d$, to the frame B and carrying a guideway $D'$ for the sprocket-chains $G'$ of the looped apron G. For the sake of clearness of the drawings this sprocket-chain $G'$ is indicated in dotted lines in Figs. 1 and 2 and the apron itself is not shown.

Pivoted at $d'$ to the frame D and dependent therefrom is the frame E, and pivoted at $e'$ to this frame E is a hanging frame $E'$. The sprocket-chains $G'$ pass over sprocket-wheels or idlers F, $F'$, $F^2$, $F^3$, and $F^4$ and over idlers $f^3$, $f^2$, and $f'$, while the loops of the apron hang down between these wheels and idlers, so as to protect the fruit from abrasion. These idlers are mounted in pairs on shafts, as indicated at $f^4$ in Figs. 5 and 6. The tackle H is connected by the yoke $H^0$ to the swinging frame D, and the fall $h$ from this tackle passes over the pulley $h^0$ and is led to the drum $H'$, driven by means of the worm $h'$ and suitable belt or other gearing from the drive-shaft $C^2$. The hanging frame E is also controlled by a tackle K, whose fall $k$ passes over the fast pulley $k^0$ near the head of the frame B and goes down to a drum $K'$, similar to the drum $H'$, which is also driven from the drive-shaft $C^2$. Suitable clutches $C^3$ are provided by means of which these drums $H'$ and $K'$ may be thrown into and out of action when desired. It will be seen that by winding up or easing off these drums the frames D, E, and $E'$ may be brought to the position indicated in dotted lines in Fig. 1 or lowered to the position indicated in full lines in Fig. 1, while the hanging frames E and $E'$ may be pulled inward or eased outward to freely enter the hatch $z$ of the vessel Z, this irrespective of the breadth of the beam of the said vessel.

For moving the apparatus along the dock I provide a worm L, meshing with the worm-wheel M on one of the axles M' of the truck on which the apparatus is mounted. This worm is driven by suitable gearing or belts or chains from the drive-shaft C², and suitable clutches should be provided similar to the clutches C³, already referred to, whereby this worm may be thrown into and out of action when desired.

In loading a vessel with the apparatus it is desired to ease the contents of the loops of the apron out gently, rather than to upset or dump them out violently, and for this purpose I provide the adjustable dumping-idlers N' N'. (Shown on a large scale in Figs. 5 and 6.) These idlers are mounted on a shaft N, which is journaled in the sliding boxes $n$, adjusted by the screw O, and these touch on the bottom of the loops of the apron G, pressing these loops outward, as indicated at Fig. 5, causing the contents of the loops to be eased into the hands of the attendants in the ship's hold. A dumping-idler F⁰ is also provided at the inner end of the carrier for convenience in unloading. For convenience in looping the apron and securing the same to the sprocket-chain the cross-ties (shown in detail in Fig. 7) are provided. These consist of a rod P, having a reduced end $p$ and preferably screw-threaded at $p'$. This reduced portion passes through the link G' of the sprocket-chain and carries a spreader $g'$ and a washer $p^2$. Screwed over the screw-thread $p'$ is the nut Q, having an angular flange $q$, against which abuts the sleeve R, which is loosely mounted on the cylindrical portion of said nut and is free to turn thereon. Over this sleeve R the apron G is looped, as at $g$, (see Fig. 3,) and the loops are fastened with any convenient strap $g^0$. Thus it will be seen that the apron may be readily put in place or removed or damaged sections of the apron may be cut out and fresh sections put in place with great facility. Thus it will be seen that the apparatus may be hoisted out of the way, may be raised or lowered, set at any angle, or adjusted to the beam of the ship or the relative height of the water and the dock, and it may be moved from place to place on the dock, and also the apron may be operated all by suitable gearing operated by the same motor, and a single engineer can control all of these operations.

It will be obvious that various modifications might be made in the herein-described apparatus which could be used without departing from the spirit of my invention.

Having thus described my invention, what I claim, and desire to secure by Letters Patent of the United States, is—

1. In a loading or unloading apparatus, the combination with a platform, of a frame and a motor mounted on said platform, a swinging frame pivoted to said frame, hanging frames pivotally connected to said swinging frame, idlers mounted in pairs in said frames, dumping-idlers mounted near the lower end of the lower hanging frame, and an endless looped apron passing between said idlers, substantially as described.

2. In a loading or unloading apparatus, the combination with a truck, of a frame and a motor mounted on said truck, a swinging frame pivoted to said frame, hanging frames pivotally connected to said swinging frame, idlers mounted in pairs in said frames, dumping-idlers mounted near the lower end of the lower hanging frame, and an endless looped apron passing between said idlers, substantially as described.

3. In a loading or unloading apparatus, the combination with a truck, of a frame and a motor mounted on said truck, a swinging frame pivoted to said frame, hanging frames pivotally connected to said swinging frame, idlers mounted in pairs in said frames, dumping-idlers mounted near the lower end of the lower hanging frame, and an endless apron having loops hanging down between said idlers, substantially as described.

4. In a loading or unloading apparatus, the combination with a platform, of a frame and a motor mounted on said platform, a swinging frame pivoted to said frame, a hanging frame pivotally connected to said swinging frame, idlers mounted in pairs in said frames, dumping-idlers journaled near the lower end of said hanging frame, an endless looped apron passing between said idlers, and drums and tackles for adjusting the angle of said swinging frame and of said hanging frame, substantially as described.

5. In a loading or unloading apparatus, the combination with a truck, of a frame and a motor mounted on said truck, a swinging frame pivoted to said frame, a hanging frame pivoted to said swinging frame, idlers mounted in pairs in said frames, dumping-idlers journaled near the lower end of said hanging frame, an endless looped apron passing between said idlers, and drums and tackles for adjusting the angle of said swinging frame and said hanging frame, substantially as described.

6. In a loading or unloading apparatus, the combination with a platform, of a frame and a motor mounted on said platform, a swinging frame pivoted to said frame, a hanging frame pivoted to said swinging frame, idlers mounted in pairs in said frames, sprocket-chains running over said idlers, removable cross-ties connecting said sprocket-chains, and an endless apron looped about said cross-ties and having said loops hanging down between said idlers, substantially as described.

7. In a loading or unloading apparatus, the combination with a truck, of a frame and a motor mounted on said truck, a swinging frame pivoted to said frame, a hanging frame pivoted to said swinging frame, idlers mounted in pairs in said frames, sprocket-chains running over said idlers, removable cross-ties connecting said sprocket-chains, and an endless apron looped about said cross-ties, and having said loops hanging down between said idlers, substantially as described.

In testimony whereof I affix my signature in presence of two witnesses.

BEVERLY J. HARRIS.

Witnesses:
M. J. CRAWFORD,
A. E. OSBORNE.